Feb. 3, 1948. N. LESTER 2,435,282
PROCESS AND APPARATUS FOR EXTRUDING PLASTIC MATERIALS
Filed Nov. 19, 1943 5 Sheets-Sheet 1

INVENTOR.
NATHAN LESTER
BY
Oberlin, Limbach & Day.
ATTORNEYS

Feb. 3, 1948.   N. LESTER   2,435,282
PROCESS AND APPARATUS FOR EXTRUDING PLASTIC MATERIALS
Filed Nov. 19, 1943   5 Sheets-Sheet 2
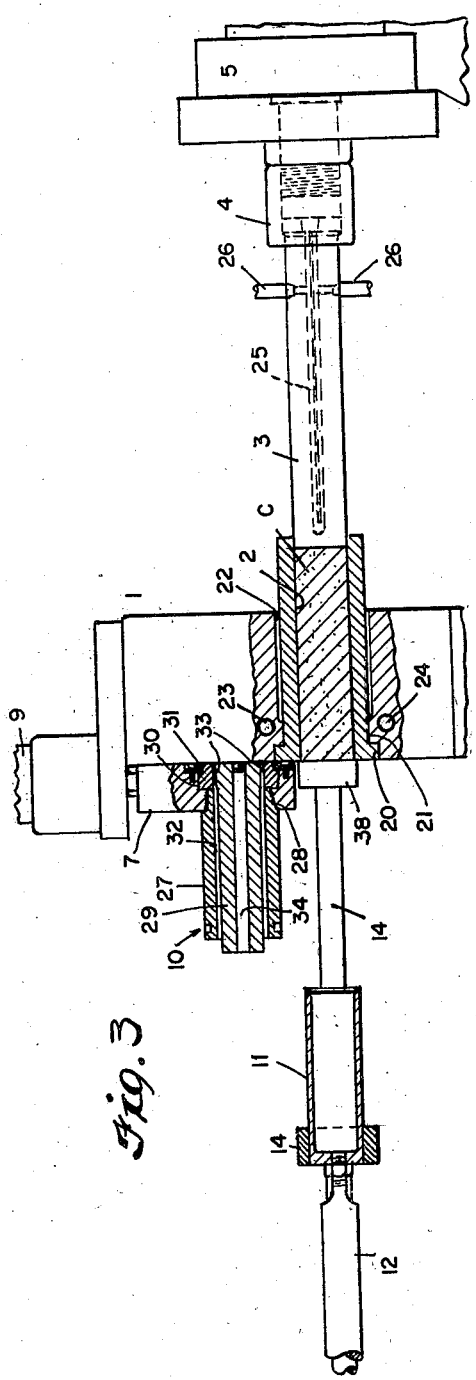
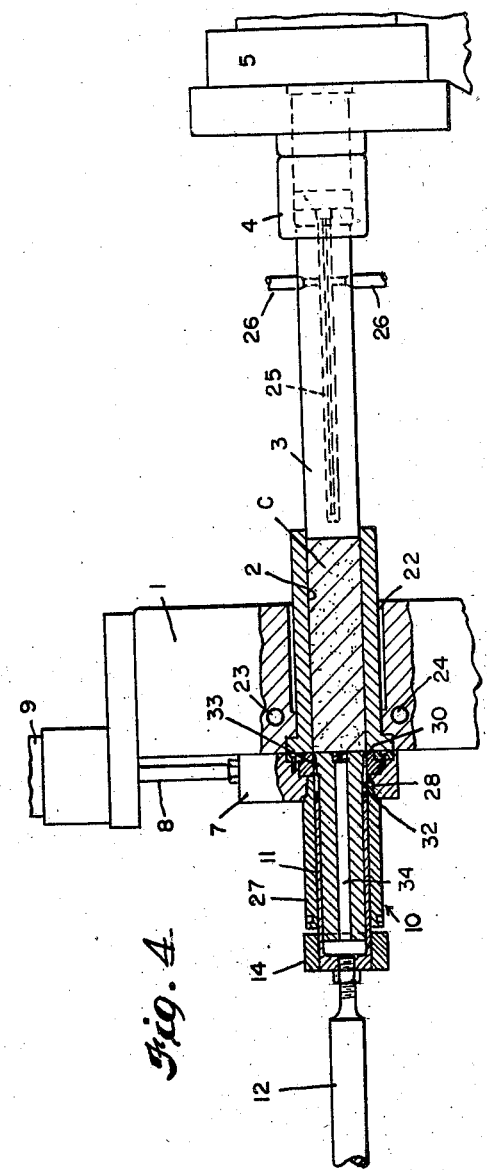
INVENTOR.
NATHAN LESTER
BY
Oberlin, Limbach & Day
ATTORNEYS Feb. 3, 1948.   N. LESTER   2,435,282
PROCESS AND APPARATUS FOR EXTRUDING PLASTIC MATERIALS
Filed Nov. 19, 1943   5 Sheets-Sheet 3
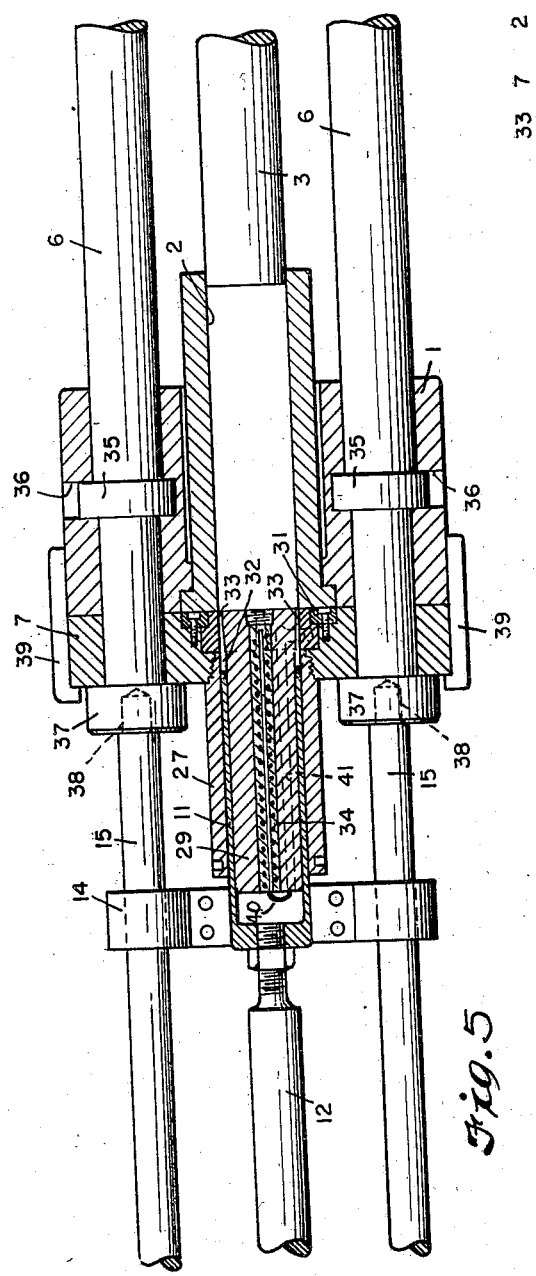
*INVENTOR.*
NATHAN LESTER
BY
Oberlin Limbach & Day
ATTORNEYS Feb. 3, 1948.  N. LESTER  2,435,282
PROCESS AND APPARATUS FOR EXTRUDING PLASTIC MATERIALS
Filed Nov. 19, 1943  5 Sheets-Sheet 4
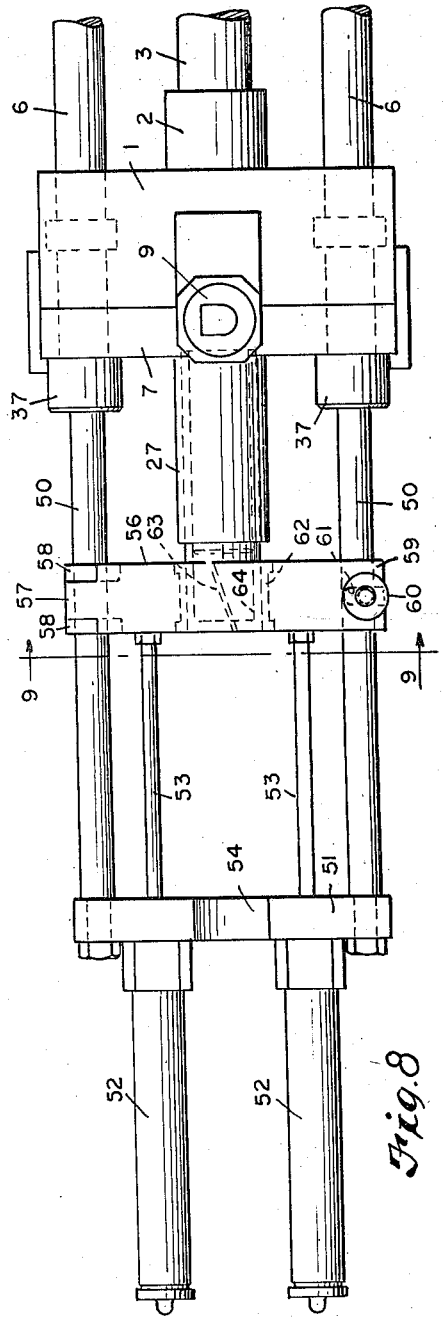
Fig. 8
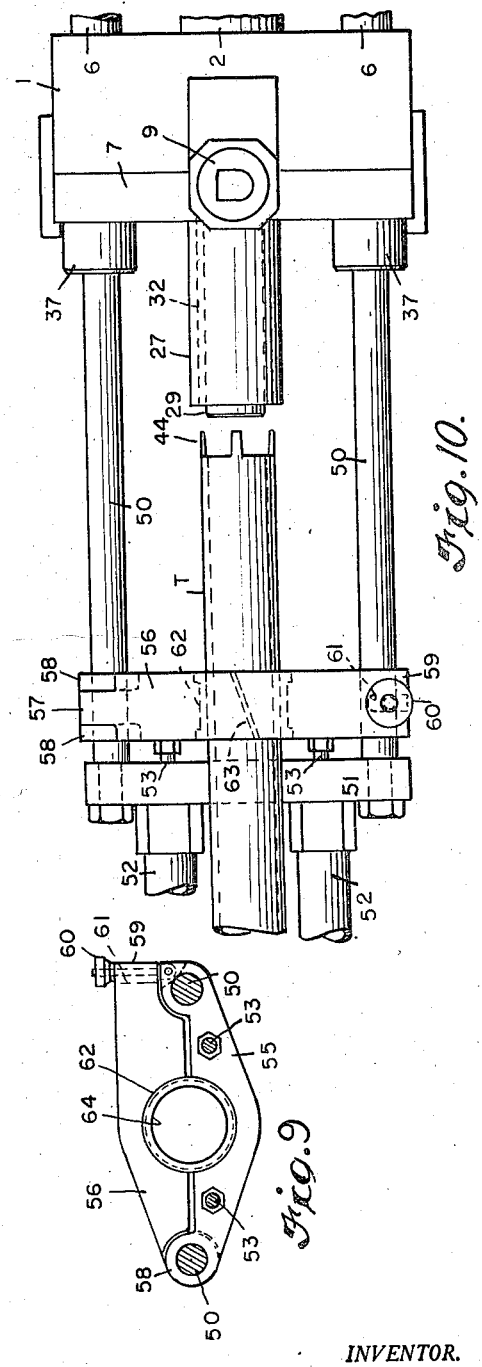
Fig. 10
Fig. 9
INVENTOR.
NATHAN LESTER
BY
Oberlin, Limbach & Day
ATTORNEYS Feb. 3, 1948.  N. LESTER  2,435,282
PROCESS AND APPARATUS FOR EXTRUDING PLASTIC MATERIALS
Filed Nov. 19, 1943  5 Sheets-Sheet 5
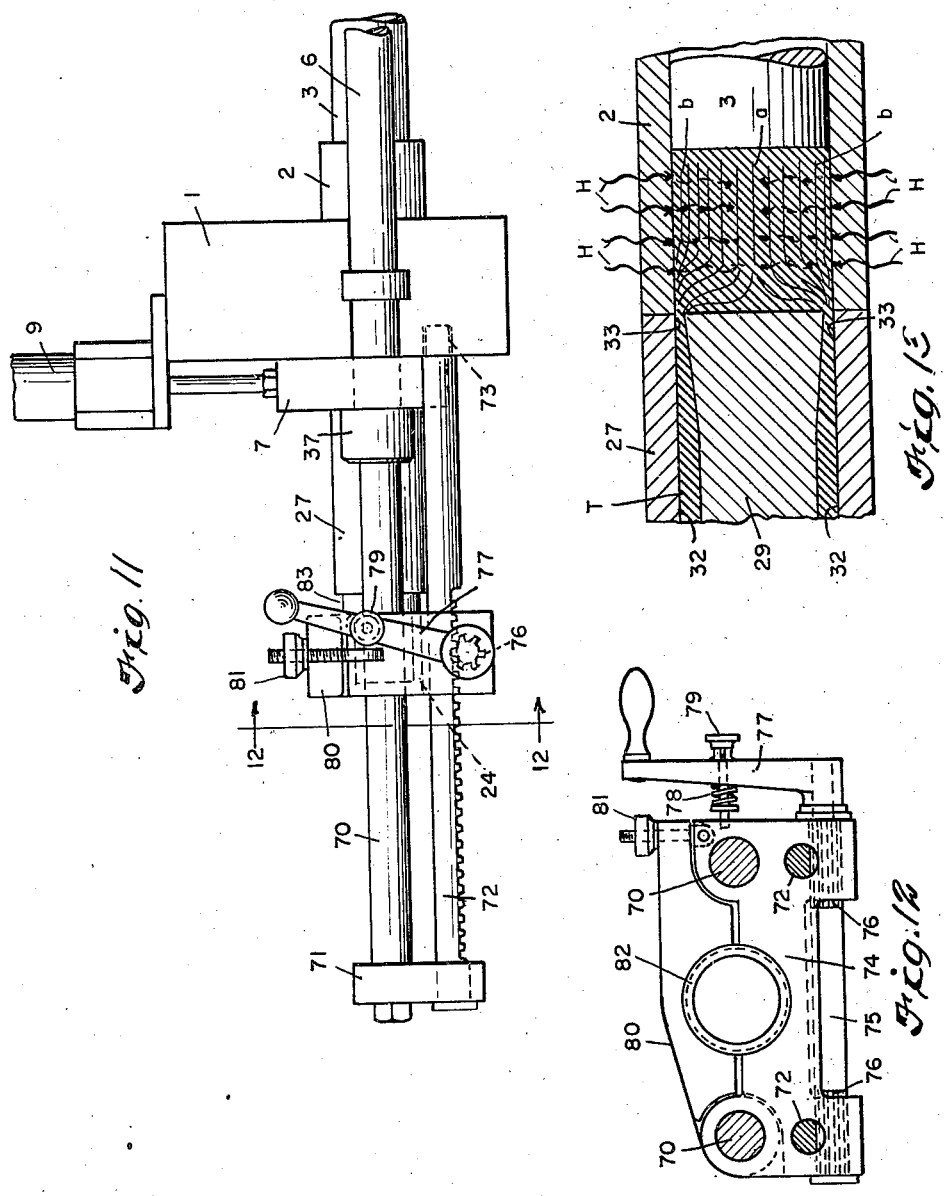
INVENTOR.
NATHAN LESTER
BY
Oberlin, Limbach & Day.
ATTORNEYS

UNITED STATES PATENT OFFICE 2,435,282

PROCESS AND APPARATUS FOR EXTRUDING PLASTIC MATERIALS

Nathan Lester, Cleveland Heights, Ohio, assignor to Lester Engineering Company, Cleveland, Ohio, a corporation of Ohio Application November 19, 1943, Serial No. 510,937

12 Claims. (Cl. 18—12)

The present invention relates to a process and apparatus for extruding plastic materials into forms such as tubes, rods and shapes. Heretofore the extrusion of plastic materials has been carried out simply by forcing the material, either by means of a ram or screw, through a forming die whence it issues in a solidified but hot, easily deformable state. It has been said that the greatest problem in plastics extrusion is to be found in the accommodation of the extruded product after it emerges from the forming die. See article by K. Vandenbree, pp. 625–636 in "Plastics Catalog" 1943 edition.

Additional difficulties and problems have been encountered in the plastics extrusion art, particularly where it has been attempted to extrude thermosetting plastic materials which are "hot setting" or require the application of heat in order to produce the chemical reaction or condensation which transforms them from the plastic to the solid state. Thermosetting plastic material such as the phenolic, phenol-furfural, urea and melamine resins undergo such hot setting or curing transformation as a time-temperature reaction. Hence, great care must be exercise to insure the correct application of heat at the right time and place in the extruding apparatus in order to prevent the thermosetting material from being cured or solidified in such parts of the machine, such as in the pressure chamber, where it is likely to cause a stoppage or breakage of the apparatus.

Furthermore, in the case of both thermosetting and thermo-plastic materials, it is desirable to maintain a relatively high confining or forming pressure on the material while it is undergoing solidification. In other words, a positive compacting action must be imparted to the plastic material as it is being formed and solidified into the shape of the desired finished product. Otherwise, the product is likely to possess the objectionable properties of blistering, crazing, surface shrinkage and vacuum voids.

The proper flow and distribution of the mass of plastic material, as it passes from the pressure chamber to the forming die, is a very important and material criterion in the extruding operation. Heretofore, a throated or converging passage has been provided between the pressure chamber and the extruding die. Due to the extremely high pressure per unit area and frictional resistance which is generated at this point in machines of the type indicated, the possibility of overheating and burning the material has always been a prominent hazard. Furthermore, as shall be subsequently pointed out in greater detail, and particularly in the case of thermosetting material, the central or innermost portion of the charge is likely to be subject to less curing action in a throated-die type of extruding machine, than the material adjacent the outer portion of the charge.

The general object and nature of my present invention is to overcome the above enumerated problems and difficulties and to produce an extruded product which conforms accurately to specified dimensions, is composed of a uniformly molded and solidified plastic material throughout, and wherein an accurate control of the material during its various stages of heating, plasticization, forming, curing and/or setting is conveniently and reliably maintained.

Briefly outlined, my invention involves the process of first plasticizing the mass of plastic material in a loading or pressure chamber, completely evacuating the plastic mass therefrom and transferring it to an initially closed forming chamber or cavity, causing the major portion of the material in such forming cavity to become set or solidified to the point where it is no longer easily deformable, opening the outer end of such cavity whereby the extruded product may issue therefrom, and finally stripping the entire charged product from the forming chamber.

By way of brief explanation of the apparatus adapted to perform the above-outlined method, my invention provides a loading or pressure chamber, the discharge end of which is adapted to be closed by a transversely slidable die block containing the tubular, or otherwise shaped, elongated forming cavity, together with a take-off plunger which is adapted to fit within the outer end of the elongated cavity and to be moved outwardly against a predetermined resistance force. Means are also provided in my apparatus for pulling or stripping the extruded product from the elongated forming cavity at the completion of the extruding and material solidification operation.

Additional objects and advantages of my invention shall become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing.

Fig. 2 is a view similar to Fig. 1 but showing the parts in a subsequent stage of operation;

Fig. 3 is an enlarged, detailed view, partially sectioned, of a portion of the apparatus shown in Fig. 1 and showing the parts in initially loaded position;

Fig. 4 is a view similar to Fig. 3, showing the parts in position ready to begin the extrusion operation;

Fig. 5 is a slightly enlarged sectional view of the parts in the position of Fig. 4 and taken upon a plane normal thereto through the axis of the pressure cylinder and forming die;

Fig. 7 is an enlarged, detailed sectional view showing the joint between the take-off plunger and the extruded tube;

Fig. 8 is a top plan view of a modified form of take-off mechanism shown in position at the beginning of the extruding operation;

Fig. 9 is a sectional view taken upon a plane normal to Fig. 8 and substantially along line 9—9 thereof;

Fig. 10 is a view similar to Fig. 8 but showing the take-off mechanism in position where the extruded product is withdrawn from the forming die;

Fig. 11 is a side elevational view of another form of take-off mechanism;

Fig. 12 is a sectional view taken upon a plane normal to that of Fig. 11 and substantially along line 12—12 thereof;

Fig. 13 is a diagrammatic view illustrating the principle of operation of my extrusion process, and particularly as applied to the extrusion of thermosetting plastic materials.

Figure 1:
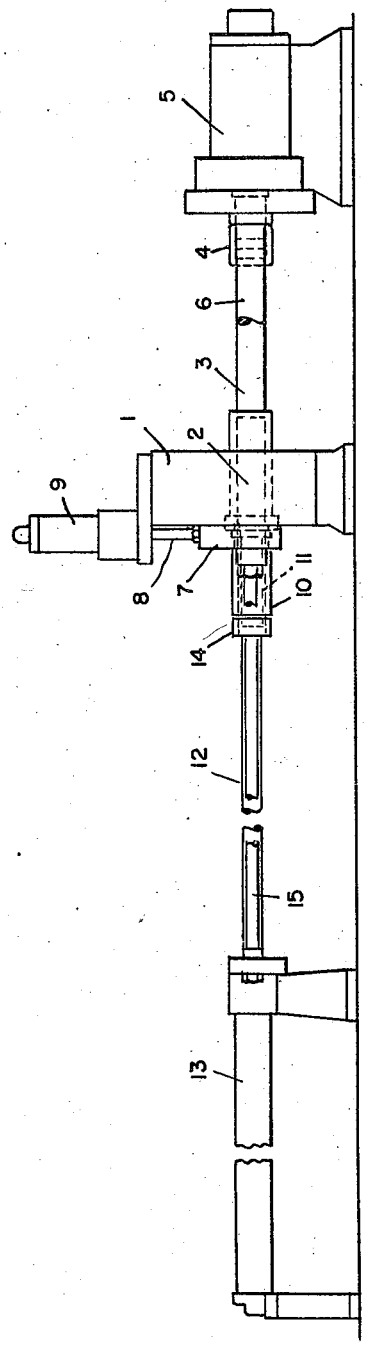
Fig. 1 is a side elevational view of an extruding apparatus embodying the principle of my invention and adapted to perform the extruding process thereof.
Figure 6:
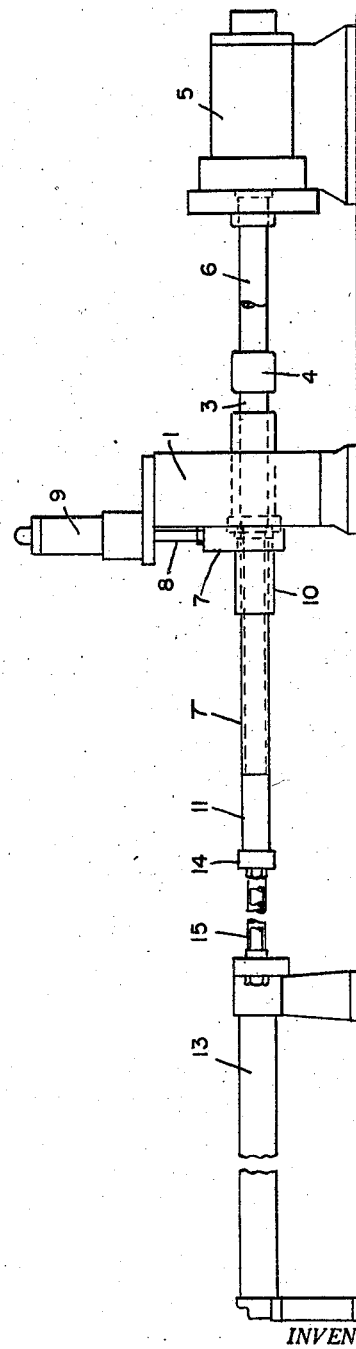
Fig. 6 is a detailed sectional view of some of the parts shown in Fig. 5, but in the final stage of operations wherein the extruded product is stripped from the forming die.

Now referring more particularly to the structure shown in Figs. 1–5 incl. of the drawings, the apparatus illustrated therein comprises a fixed block 1 in which the loading or pressure cylinder 2 is mounted, with the pressure plunger 3 adapted to work within the cylinder 2. The plunger 3 is connected by means of the coupling 4 to the piston of the hydraulic power cylinder 5. A pair of tie rods 6, 6 extend from, and join the block 1 to the cylinder 5.

A die block 7 is adapted to reciprocate vertically across the face of the cylinder block 1, or in a direction transverse to the axis of the cylinder 2. To effect this movement, the die block 7 is connected by means of the piston rod 8 to a hydraulic piston within the prime moving cylinder 9 mounted on top of the cylinder block 1.

The die block 7 also carries the elongated forming die 10 which, when in extruding operation position, is in longitudinal alignment with the pressure cylinder 2. A take-off plunger 11, which in the presently illustrated and described case is in the form of an annular cylinder or sleeve, is adapted to fit within the forming cavity of the die 10. The take-off plunger 11 is connected to the end of the piston rod 12 whose piston operates within the power cylinder 13.

As best shown in Fig. 5, the take-off plunger is supported on a sliding bracket or carriage 14 which is adapted to ride back and forth on the tie rods 15 which in turn form a continuation of the tie rods 6 and are joined at their left-hand or outer end to the head plate of the cylinder 13.

When the parts are in the position as shown in Fig. 1, with a charge of plastic material to be extruded in the cylinder 2, the plunger 3 moves in a left-hand direction to force the material into the elongated forming die 10, thus forming the extruded product such as the tube T shown in Fig. 2. Simultaneously, the take-off plunger 11 is moved in a left-hand direction against a predetermined pressure resistance in the cylinder 13, until all of the material has been evacuated from the cylinder 2. Thus, Figs. 1 and 2 generally illustrate the respective position of the parts at the beginning and end of the extrusion operation proper.

The cylinders 5, 9 and 13 may be operated by means of either pneumatic or hydraulic fluid pressure and in the desired sequence, either by manually or automatically operated control valves and pressure regulators. Such control system is not herein shown or described in detail inasmuch as the structure of same should be obvious to those skilled in the art.

The more detailed construction of the apparatus, as well as the important refinements of the extrusion process, are shown in Figs. 3–7 incl. The pressure cylinder 2 has a laterally projecting flange 20 at its left-hand end which is mounted against the shoulder 21 in the cylinder block 1. A clearance space 22 is provided between the block 1 and the cylinder 2 for the majority of the co-extent of these two elements. The clearance space 22 may be used either as an air cooling passage, as a space for the reception of insulating material to prevent the eduction of heat from the cylinder 2 to the block 1, or for the reception of a heating element for heating the cylinder 2, as the case might be. Liquid coolant passages 23 and 24 are provided adjacent the cylinder block shoulder 21 for preventing the transmission of heat from the forming die 10 to the cylinder 2.

The plunger 3 is cooled by means of the interior bore through which a cooling liquid, such as water, can be circulated by means of the flexible tube connectors 26.

The forming die comprises an outer cylinder or sleeve 27 which is threadably mounted in the die block 7, as indicated at 28. An interior, cylindrical arbor 29 is mounted within the sleeve 27 and by means of the laterally projecting flange 30 on its inner or right-hand end which is in turn held in the die block 7 by means of the retaining ring 31. The sleeve 27 and arbor 29 are spaced from each other, thus forming the tubular die cavity 32, to which communication is had by means of the circumferentially spaced gate passages 33. The gate passages 33 are tapered convergently from the die cavity 32 to their inner or right-hand end in the plane of the face of the die block 7 where they communicate with the left-hand end of the pressure cylinder 2 and at points adjacent the side walls of the latter.

The arbor 29 has a central bore in which the heating coil 34 is located.

The tie rods 6 are anchored to the die block 1 by means of the collars 35 formed as an integral part of the rods 6 and received within the wells or slots 36 in the block 1. The tie rods 6 also have enlarged head portions 37 abutting the left-hand or outer face of the die block 7, and to which the take-off plunger tie rods 15 are threadably attached, as indicated at 38. The guide plates 39 extend from the block 1 to the outer face of the die block 7, to guide the latter in its up and down movement.

A slight "play" or clearance, on the order of .005 in., is permitted to exist between the end faces of the collars 35 and the surfaces of the die block 1, against which they are adapted to abut. The purpose of this play or clearance is three-fold: First, it permits ease of movement of the die block 7 between the positions shown in Figs. 3 and 4; secondly, it results in a transmission of the force exerted by the cylinder 5 to draw the heads 37 tightly against the die block 7 and the latter tightly against the face of the cylinder block 1, during the extruding operation; and thirdly, it results in applying a tensioning force to the take-off plunger tie rods 15 to insure the maintenance of the latter in a true straight line position and to prevent any tendency toward sagging or bending therein.

The electric heating coil 34 has its lead wires 40 disposed in the passage 41 in the arbor 29. The passage 41 leads to the exterior of the die block 7, as indicated at 42, so as to permit connection to a source of electrical current exteriorly of the machine. The take-off plunger has a female thread portion 43 on its outer end into which the plastic material is adapted to be molded and set, so that the plunger 11 becomes firmly connected to the extruded tube T. This connection between the plunger 11 and tube T is important in the final stage of operation of the process and apparatus, as will now be described in detail.

The parts of the apparatus being initially in the position as shown in Fig. 3, the plastic material to be cast is charged into the pressure cylinder 2. This material, as indicated at C, is preferably in the form of a pre-form, i. e. tableted or briquetted plastic material either as a single, or several cylindrical pieces. This pre-form may either be heated exteriorly of the machine to a temperature approaching the softening or plasticizing point of the plastic, or it may be charged cold into the cylinder 2 and heated to such softening temperature by means of a heating coil surrounding the cylinder 2, heretofore indicated as being optionally present.

The die block 7 is then moved downwardly into the position of Fig. 4, by means of actuation of the prime moving cylinder 9. The take-off plunger 11 is then moved into the die cavity 32 to the position shown in Fig. 4, by means of the power cylinder 13.

The plunger 3 then starts on its working stroke, moving in a left-hand direction to force the softened and plasticized charge of plastic material C from the cylinder 2 through the gate passages 33 into the (at this point) relatively small tube forming die cavity 32. In the case of extruding thermosetting plastic material, that material which is forced into the cavity 32 is subjected to a curing temperature sufficient to cause it to set and solidify. At the same time, the material flows into the threads 43 on the end of the plunger 11 and is thus joined thereto. The plunger 11 is held against outward or left-hand movement by means of a predetermined pressure in the cylinder 13. Thus, the plastic material is held in a positively confined die cavity as it undergoes the setting and solidification action.

The plunger 3 continues to move in a left-hand direction forcing more material through the gate passages 33, into the cavity 32, thereby increasing the pressure against the right-hand end of the take-off plunger 11. As this pressure exceeds the resistance or counter pressure in the cylinder 13, the piston rod 12 and take-off plunger 11 move in a left-hand direction out of the die cavity 32 and to a point away therefrom corresponding to the evacuation of all of the charge C from the cylinder 2. This point then marks the end of the working stroke of the plunger 3. All of the plastic material remaining in the die cavity 32 and gate passages 33 is permitted to become cured or set, and then the pressure is reversed in the cylinder 13 to draw the take-off plunger 11 in a left-hand direction and thus to pull the extruded tube T, together with the gate slugs 44 completely out of the die cavity 32. The tube T can then be simply unscrewed from the plunger 11 and the cycle of operation repeated by moving the die block 7 to its position as shown in Fig. 3 where the apparatus is ready for another charge of plastic material to be received therein.

Although a cylindrical tube has been hereinabove referred to as the product of the process and apparatus, for the purpose of convenience in illustration, it will be equally apparent to those skilled in the art that equivalent forms of tubes, whether of square, rectangular or polygonal cross section, and that solid cross sectional forms such as rods and shapes, can equally well be produced, all within the spirit and scope of my invention.

An alternative form of take-off mechanism is shown in Figs. 8, 9 and 10, wherein the relatively shorter tie or supporting rods 50, mounted in the heads 37 of the tie rods 6, have their outer ends joined by the cross plate 51 upon which the pressure cylinders 52, 52 are mounted. The piston rods 53 from the cylinders 52 are connected to the lower half 55 of the sliding bracket or carriage. The cross plate 51 has a semicircular recess or half saddle 54 in alignment with the die cavity within the sleeve 27. The upper half 56 of the carriage is pivotally connected at its end 57 to one of the tie rods 50 by the bifurcations 58 of the lower half 55. The other end 59 of the upper carriage half 56 is adapted to be engaged by the eye bolt and nut 60 which pivotally swings into the slot 61.

A contractible bushing or collet 62, having the diagonal split 63, is adapted to be clamped between the carriage halves 55 and 56, and in turn to engage alternatively the take-off plunger 64 or the extruded tube T.

The operation of the take-off mechanism above described in connection with Figs. 8–10 incl. is as follows: The take-off plunger 64 is initially clamped between the supporting carriage halves 55 and 56, as shown in Fig. 8 and moved within the interior of the die sleeve 27. The nut 60 is adjusted to a clamping pressure which is found to be equivalent to imparting the desired resistance upon the outward or left-hand movement of the take-off plunger 64 as the plunger 3 moves on its working stroke. As the take-off plunger 64 and extruded tube T moves out of the die cavity 27 to a point where the plunger 64 is clear of the supporting carriage halves 55 and 56, the latter then frictionally engages the tube T to impart the necessary counter-resistance to the plastic material being injected into the die cavity by the plunger 3. During these operations, sufficient pressure is, of course, maintained in the cylinders 52 to hold the carriage halves 55 and 56 in the position shown in Fig. 8.

At the end of the working stroke of the plunger 3, the pressure is reversed in the cylinders 52 and the carriage halves 55 and 56 moved in a left-hand direction to the position shown in Fig. 10 whereupon the extruded tube is pulled out of the die cavity 32. The nut 60 is then unscrewed, the eye bolt swung clear of the end 59 of the upper carriage half 56, and the latter in turn swung about its pivoted end 58 so that the tube can be lifted up and removed from the machine.

Another alternative form of take-off mechanism is shown in Figs. 11 and 12 wherein the supporting bars 70, likewise attached at their inner or right-hand end to the heads 37 of the tie rods 6, are joined at their left-hand or outer ends by means of the cross plate 71. Rack bars 72 are also mounted in the cross plate 71 and at their inner ends are mounted as at 73 in the cylinder block 1.

A sliding carriage 74 is mounted on the bars 70 and also has bores through which the rack bars 72 may pass. A pinion shaft 75 is mounted in the carriage 74 and has the pinion gears 76 on each of its ends which are adapted to engage with the teeth of the rack bars 72. A crank 77 is affixed to the end of the shaft 75 and normally held in a locked position by means of the spring loaded stop pin 78. The stop pin 78 fits within a hole in the carriage 74 and may be drawn clear thereof by means of the operating nob 79 on its outer end.

The carriage 74 also carries an upper, pivoted half portion 80, similar to the previously described carriage portion 56, and the releasable eye bolt and clamping nut 81. A contractible bushing or collet 82 is adapted to be clamped between the carriage parts 74 and 80 and in turn frictionally to engage the take-off plunger 83 and the extruded tube.

The operation of the take-off mechanism shown in Figs. 11 and 12 is similar to that of the form of take-off mechanism illustrated and described in connection with Figs. 8, 9 and 10. Suffice it to say that the crank 77, gear 76 and rack bar 72 serve the equivalent function of the pressure cylinders 52 and piston rods 53. The carriage 74 is locked in the position as shown in Fig. 11, and then at the end of the extrusion stroke, the crank 77 is unlocked and rotated to draw the carriage and the extruded stock out of the die cavity.

Fig. 13 is more or less a diagrammatic illustration for the purpose of aiding in the understanding of the principle of operation of my invention, particularly as applied to the extrusion of thermosetting materials. The wavy arrows H illustrate the manner in which the softening or pre-plasticizing heat is applied to the plastic material, whether it be exteriorly of or within the pressure cylinder 2. That is to say, the heat must journey from the outside to the inside of the mass of material. This means that those portions of the material adjacent the exterior, such as indicated by lines $b$, are necessarily subjected to more heat and for a relatively longer period of time than the material in the central portion of the mass, as indicated at $a$.

Since the solidification of thermosetting plastic materials is a time-temperature reaction, those portions of a given mass of material which are subjected to the greater amount of heat for the relatively longer time will obviously tend to solidify or set up sooner than those which have been heated less and for a shorter time. Thus, it can be seen that it is imperative to remove those portions of the plastic materials charged from the pressure cylinder 2 which are closest to the point of curing or solidification. The lines at $a$ and $b$ in Fig. 13 illustrate the flow power of the outer and inner portions of the charge, respectively, from the cylinder 2 into the gate passages 33 and thence to the die cavity 32. These flow lines show that the outermost material has the more direct route to the die cavity 32 than the material in the central portion of the charge. Having the shorter route, it necessarily follows that the outermost material is evacuated from the cylinder 2 sooner than the innermost material, so that in the extruded stock, there is a uniformity in the degree of curing of the plastic material. Furthermore, the possibility of forming any pockets or deposits of cured and set material in the pressure cylinder 2, which is most likely to occur in the outermost portions $b$ of the charge, is overcome.

Other modes of applying the principle of the invention may be employed, change being made as regards the details described, provided the features stated in any of the following claims or the equivalent of such be employed.

I therefore particularly point out and distinctly claim as my invention:

1. The method of extruding plastic materials into elongated forms consisting in the steps of injecting the material while in a plastic state under pressure into one end of an elongated forming die cavity, applying a counter pressure on said material at the other end of said die cavity to exert a compression on said material during such injection, solidifying said material in the intermediate portion of said die cavity, and positively gripping the end of the solidified material, then, upon completion of said injecting step, pulling on the solidified material to draw it out of said other end of said die cavity.

2. The method of extruding plastic materials into elongated forms consisting in the steps of injecting the material while in a plastic state into one end of an elongated die cavity having the cross-sectional shape of the article to be formed, moving said material from said one end to the other of said die cavity, causing said material to become set and solidified while so moving it, and positively gripping the end of the solidified material and forcing the set material from the opposite end of said die cavity, exerting a resistance pressure against the end of the set material moving through said die cavity, and then, upon completion of the aforesaid injection of material into said die cavity, pulling upon the end of the set material to evacuate all of the material from said die cavity.

3. The method of molding tubes, rods and shapes of thermosetting plastic material, consisting in the steps of introducing a quantity of said material to a heating and pressure chamber to reduce it to the plastic state, evacuating the entire quantity of the so plasticized material from said chamber and into an elongated forming cavity, applying further heat and pressure to said material while in said cavity to cause it to set and solidify, and pulling the set material from the opposite end of said cavity from that to which such softened plastic material was introduced.

4. Apparatus for extruding plastic materials, comprising a pressure cylinder for receiving the material to be extruded, a die block transversely movable into and out of closing relationship with the end of said cylinder, an elongated forming die carried by said die block, one end of said die being adapted to communicate with said cylinder, and a movable plunger mounted in longitudinal alignment with said die when the latter is in communicating position with said cylinder, said plunger fitting within said die and being entrant therein from its other end.

5. Apparatus for extruding plastic materials, comprising a pressure cylinder for receiving the material to be extruded, a die block transversely movable into and out of closing relationship with the end of said cylinder, an elongated forming die carried by said die block, one end of said die being adapted to communicate with said cylinder, a movable plunger mounted in longitudinal alignment with said die when the latter is in communicating position with said cylinder, said plunger fitting within said die and being entrant therein from its other end, and movement resisting means connected to said plunger for yieldably resisting the movement of the latter in a direction out of said die.

6. Apparatus for extruding plastic materials, comprising a cylinder block having a material receiving cylinder and plunger adapted to reciprocate therein, a power cylinder and piston connected to said plunger, tie bars secured at one end to said power cylinder and extending beyond said cylinder block, a die block transversely movable across the face of said cylinder block and into and out of closing relationship with the end of said material receiving cylinder, said die block being adapted to fit over said tie bars, and a movable take-off plunger supported on said tie bars on the side of said die block opposite to that of said material receiving cylinder.

7. Apparatus for extruding plastic materials, comprising a cylinder block having a material receiving cylinder and plunger adapted to reciprocate therein, a power cylinder and piston connected to said plunger, tie bars secured at one end to said power cylinder and extending beyond said cylinder block, a die block transversely movable across the face of said cylinder block and into and out of closing relationship with the end of said material receiving cylinder, said die block being adapted to fit over said tie bars, a movable take-off plunger supported on said tie bars on the side of said die block opposite to that of said material receiving cylinder, and a second power cylinder connected to the other end of said tie bars, with its piston connected to said take-off plunger.

8. Apparatus for extruding plastic materials, comprising a cylinder block having a material receiving cylinder and plunger adapted to reciprocate therein, a power cylinder and piston connected to said plunger, a die block transversely movable across the face of said cylinder block and into and out of closing relationship with the end of said material receiving cylinder, a movable take-off plunger adapted to fit within said die block, a support for said plunger mounted on said cylinder block on the side opposite to that of said power cylinder, and friction engagement means in association with said support for engaging the extruded stock and thereby braking the movement thereof out of said die block.

9. Apparatus for extruding plastic materials, comprising a cylinder block having a material receiving cylinder and plunger adapted to reciprocate therein, a power cylinder and piston means connected to said plunger, a die block transversely movable across the face of said cylinder block and into and out of closing relationship with the end of said material receiving cylinder, a movable take-off plunger adapted to fit within said die block, a support for said plunger mounted on said cylinder block on the side opposite to that of said material receiving cylinder, friction engagement means carried by said support for alternately engaging said take-off plunger and the extruded stock for braking the movement of the latter out of said die block, and a second power cylinder and piston means connected to said friction engagement means for pulling such extruded stock in a direction away from said die block.

10. Apparatus for extruding plastic materials, comprising a cylinder block having a material receiving cylinder and plunger adapted to reciprocate therein, a power cylinder and piston means connected to said plunger, a die block transversely movable across the face of said cylinder block and into and out of closing relationship with the end of said material receiving cylinder, a movable take-off plunger adapted to fit within said die block, a support for said plunger mounted on said cylinder block on the side opposite to that of said material receiving cylinder, friction engagement means carried by said support for alternately engaging said take-off plunger and the extruded stock for braking the movement of the latter out of said die block, and gear means associated with said friction engagement means for pulling such extruded stock in a direction away from said die block.

11. Apparatus for extruding plastic materials, comprising a cylinder block having a material receiving cylinder and plunger adapted to reciprocate therein, a power cylinder and piston means connected to said plunger, tie bars joining said cylinder block and said power cylinder, supporting bars projecting from the opposite side of said cylinder block, a die block transversely movable across such opposite side of such cylinder block and into and out of closing relationship with the end of said material receiving cylinder, a take-off plunger fitting within said die block, a carriage mounted on said supporting bars, a releasable clamp on said carriage for alternately engaging said take-off plunger and the extruded stock, and a second power cylinder and piston means mounted on the outer ends of said supporting bars and connected to said carriage for moving the latter away from said die block and thereby pulling the extruded stock engaged by said clamp out of said die block.

12. Apparatus for extruding plastic materials, comprising a cylinder block having a material receiving cylinder and plunger adapted to reciprocate therein, a power cylinder and piston means connected to said plunger, tie bars joining said cylinder block and said power cylinder, supporting bars projecting from the opposite side of said cylinder block, a die block transversely movable across such opposite side of such cylinder block and into and out of closing relationship with the end of said material receiving cylinder, a take-off plunger fitting within said die block, a carriage mounted on said supporting bars, a releasable clamp on said carriage for alternately engaging said take-off plunger and the extruded stock, and rack and gear means connected to said carriage for moving the latter away from said die block and thereby pulling the extruded stock engaged by said clamp out of said die block.

NATHAN LESTER.

(References on following page)

REFERENCES CITED

The following references are of record in the file of this patent:

UNITED STATES PATENTS

| Number | Name | Date |
|---|---|---|
| 635,026 | Saunders | Oct. 17, 1899 |
| 1,560,368 | Bartels et al. | Nov. 3, 1925 |
| 2,228,721 | Edmonson | Jan. 14, 1941 |
| 2,295,823 | Banigan et al. | Sept. 15, 1942 |
| 1,183,427 | Brown | May 16, 1916 |
| 1,370,800 | Egerton | Mar. 8, 1921 |
| 1,993,942 | Novotny | Mar. 12, 1935 |
| 1,997,074 | Novotny | Apr. 9, 1935 |

FOREIGN PATENTS

| Number | Country | Date |
|---|---|---|
| 388,662 | Great Britain | Mar. 2, 1933 |
| 260,855 | Great Britain | Nov. 11, 1926 |
| 445,852 | Great Britain | Apr. 17, 1936 |
| 131,882 | Switzerland | Oct. 1, 1929 |
| 391,921 | Great Britain | May 11, 1933 |
| 401,428 | Great Britain | Nov. 16, 1933 |
| 548,861 | Great Britain | Oct. 27, 1942 |
| 388,662 | Great Britain | Mar. 2, 1933 |